US011490032B2

(12) United States Patent
Mustapha

(10) Patent No.: US 11,490,032 B2
(45) Date of Patent: Nov. 1, 2022

(54) METHOD AND APPARATUS FOR CREATING AND DISPLAYING VISUAL MEDIA ON A DEVICE

(71) Applicant: Sulaiman Mustapha, Sylvania, OH (US)

(72) Inventor: Sulaiman Mustapha, Sylvania, OH (US)

(*) Notice: Subject to any disclaimer, the term of this patent is extended or adjusted under 35 U.S.C. 154(b) by 0 days.

(21) Appl. No.: 17/050,544

(22) PCT Filed: Apr. 26, 2019

(86) PCT No.: PCT/US2019/029304
§ 371 (c)(1),
(2) Date: Oct. 26, 2020

(87) PCT Pub. No.: WO2019/210139
PCT Pub. Date: Oct. 31, 2019

(65) Prior Publication Data
US 2021/0195118 A1    Jun. 24, 2021

Related U.S. Application Data

(60) Provisional application No. 62/795,383, filed on Jan. 22, 2019, provisional application No. 62/663,118, filed on Apr. 26, 2018.

(51) Int. Cl.
*H04N 5/262* (2006.01)
*H04N 5/268* (2006.01)
*G06T 3/60* (2006.01)
*G06F 3/04845* (2022.01)

(52) U.S. Cl.
CPC ....... *H04N 5/2628* (2013.01); *G06F 3/04845* (2013.01); *G06T 3/60* (2013.01); *H04N 5/268* (2013.01)

(58) Field of Classification Search
CPC .. H04N 5/2628; H04N 5/268; G06F 3/04845; G06F 3/0488; G06T 3/60
See application file for complete search history.

(56) References Cited

U.S. PATENT DOCUMENTS

| 9,531,970 B2 | 12/2016 | Haji-Kahmneh et al. |
| 9,723,212 B2 | 8/2017 | Chukka et al. |
| 10,460,765 B2 | 10/2019 | Bloch et al. |
| 10,554,926 B1 | 2/2020 | Post, Jr. et al. |
| 2005/0168583 A1 | 8/2005 | Thomason |
| 2006/0182437 A1 | 8/2006 | Williams et al. |

(Continued)

FOREIGN PATENT DOCUMENTS

| CA | 2248069 | 3/1996 |
| WO | WO 2000/49448 A | 8/2000 |

OTHER PUBLICATIONS

"Create your video site", https://fw.tv/, retrieved Nov. 18, 2020, 5 pages.

(Continued)

*Primary Examiner* — Abdelaaziz Tissire
(74) *Attorney, Agent, or Firm* — Fay Sharpe LLP

(57) ABSTRACT

Devices and methods for formatting visual content to produce a visual content format that may adapt to and fill the dimensions of a viewer display screen are provided. The visual content is circularized and linked to a horizon line defined by a motion sensor of an associated device.

19 Claims, 8 Drawing Sheets

(56) References Cited

U.S. PATENT DOCUMENTS

| | | |
|---|---|---|
| 2007/0081081 A1 | 4/2007 | Cheng |
| 2008/0044169 A1* | 2/2008 | Wernersson ....... H04N 5/23229 396/50 |
| 2014/0267806 A1 | 9/2014 | Kennedy et al. |
| 2014/0320525 A1* | 10/2014 | Sakai .................. G06F 3/04845 345/620 |
| 2014/0320715 A1* | 10/2014 | Haji-Khamneh ........................... H04N 5/23229 348/302 |
| 2015/0181123 A1 | 6/2015 | Pacurariu et al. |
| 2015/0341536 A1 | 11/2015 | Huang et al. |
| 2016/0006930 A1 | 1/2016 | Voss |

OTHER PUBLICATIONS

PCT/US2019/029304 International Search Report and Written Opinion, dated Aug. 16, 2020.
PCT/US2019/029304 International Preliminary Report on Patentability, dated Oct. 27, 2020.

\* cited by examiner

METHOD AND APPARATUS FOR CREATING AND DISPLAYING VISUAL MEDIA ON A DEVICE

BACKGROUND

The present exemplary embodiment relates to methods and devices for creating and displaying visual content. It finds particular application in conjunction with providing a video and image content format that (i) fills the entire display of a media device regardless of the screen size and orientation, and (ii) seamlessly transitions the displayed visual content as the viewership device is moved and will be described with particular reference thereto. However, it is to be appreciated that the present exemplary embodiment is also amenable to other like applications.

Currently, the majority of the displays present on media devices (smartphones, tablets, tablet PC, televisions, watches etc.) have a rectangular form factor. These devices are usually equipped with at least one imaging hardware component (e.g., an image sensor) that is also rectangular. Capturing an image or video (visual content) with current hardware results in visual content that is likewise, rectangular (in either a first/portrait/vertical orientation or a second/landscape/horizontal orientation). The software of a media device processes the captured visual content data and the visual content may be displayed on an associated rectangular display or on another viewership device in either a fixed orientation, for devices that have a generally fixed position such as a television or in one of two discrete orientations relative to a rotational position of the media device (i.e., a portrait or landscape orientation). Depending on the position of the device on which the visual content is captured and/or the orientation of the media device on which the visual content is viewed, the displayed visual content either (i) fills the entire screen or (ii) is accompanied by margin effects ("margins"), generally embodied as a pair of top and bottom and/or right and left artifacts, that appear with the visual content. In most applications, the visual content is centered within the margin effects, commonly known as letterboxing and pillarboxing.

Generally, visual content is formatted based on a desired end use and therefore a multitude of media formats exist. Each type of media format, cinema, television, internet, smart device, etc., is configured with an aspect ratio. The multitude of aspect ratios is inconvenient for both visual content creators and consumers of that visual content as the selected viewership device by a consumer may not match the format of the created visual content. Thus, it is common for visual content to be presented with modifications. Modifications, including margin effects, are particularly prevalent when visual content is created with one capture device and the visual content is shared to other devices with a display having an aspect ratio that is different from the aspect ratio of the captured visual content. Due to the multitude of different form factors for media devices and displays, it is difficult to create an equal media experience for every user accessing the visual content. That is, those users with displays that match the aspect ratio of the visual content, view the visual content as filling the entire display. Those users with a display that does not match the aspect ratio view the visual content with undesirable margin effects.

The equal media experience is even more difficult to achieve with portable media devices subject to user rotation. Generally, a user viewing a received visual content on a portable media device may rotate the media device from a portrait orientation to a landscape orientation (or vice versa) if the margins are present and the user would like to view the visual content while minimizing the margin effect, i.e., have the image fill as much of the screen as possible. However, it is also recognized that many users of portable media devices do not bother rotating the media device to view the visual content in a manner that avoids the margin effect—for whatever reason (e.g., takes too long, don't want to be bothered, etc.). Thus, a need exists for creating and/or displaying visual content in a manner that automatically utilizes the entire area of a display regardless of the media device used or viewing orientation of such device. That is, the viewership of the visual content is at least free of margin effects.

It is desirable to meet the needs of the prior art using existing hardware that display captured visual content on a device without margin effects and where the displayed visual content seamlessly maintains and fills the entire display screen regardless of the orientation of the display device including during the transition from a first orientation to a second orientation, i.e., the displayed visual content does not "jump" between "portrait" and "landscape" modes where at least one of those display modes includes visually perceived margins.

Furthermore, as will become apparent below, it is desirable to provide a visual content consumer with the opportunity to become an active participant in the media experience. Briefly, a media consumer is able to rotate a viewership device to selectively view portions of captured visual content.

BRIEF DESCRIPTION

The present disclosure relates to devices and methods for formatting and viewing visual content to produce a format that may adapt and fill the entire, available dimensions of a display screen. The devices and methods find particular application in conjunction with images (photographs) and videos captured by smart devices incorporating a camera and will be described with particular thereto. However, it is to be appreciated that the present disclosure is also amenable to other like applications.

In accordance with some aspects of the present disclosure, a formatting device for visual content is provided. The formatting device includes a motion sensor, an image sensor configured to capture visual content data, a storage medium that at least temporarily stores visual content data therein; and a processor configured to link visual content data to a horizon line defined by the motion sensor. The visual content data includes at least one image.

In accordance with other aspects of the present disclosure, methods for formatting visual content are provided. Some methods include providing an electronic device including at least one motion sensor, an image sensor, a storage medium/memory configured to at least temporarily store visual content data captured by the image sensor and a processor configured to execute a set of instructions. The instructions include generating circular visual content (e.g. cropping rectangular content to a circle format where the cropped visual content fills an entirety of the area of the cropped circle) and linking the circular visual content to a motion sensor of the device.

In accordance with some aspects of the present disclosure, methods for converting visual content from a rectangular display configuration to a universal mode that displays the visual content in at least both portrait and landscape modes without margins are provided. One preferred method includes the steps of (i) generating circularly formatted visual content, wherein the circularly formatted visual content is located within the confines of a circle having a circle edge, (ii) linking the circularly formatted visual content to one of a stable horizon line and a preferred direction with respect to gravity; and (iii) mapping an orientation dependent selection of the circularly formatted visual content data to a rectangular display of a display device, wherein at least one corner of the rectangular display abuts the circle edge of the circularly formatted visual content so that the orientation dependent selection of the circularly formatted visual content fills the entirety of the rectangular display.

In accordance with other aspects of the present disclosure, imaging devices including a circular image sensor are provided. The imaging device includes an electronic processor, a circular imaging sensor; and at least one circularly shaped optical lens. The circularly shaped optical lens is in optical communication with the circular imaging sensor such that the majority if not all information captured by the circular lens is communicated and captured by the circular image sensor. The electronic processor of the imaging device is configured to link a stable horizon line to captured visual content via a motion sensor of the imaging device, a user command, or a default orientation setting.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
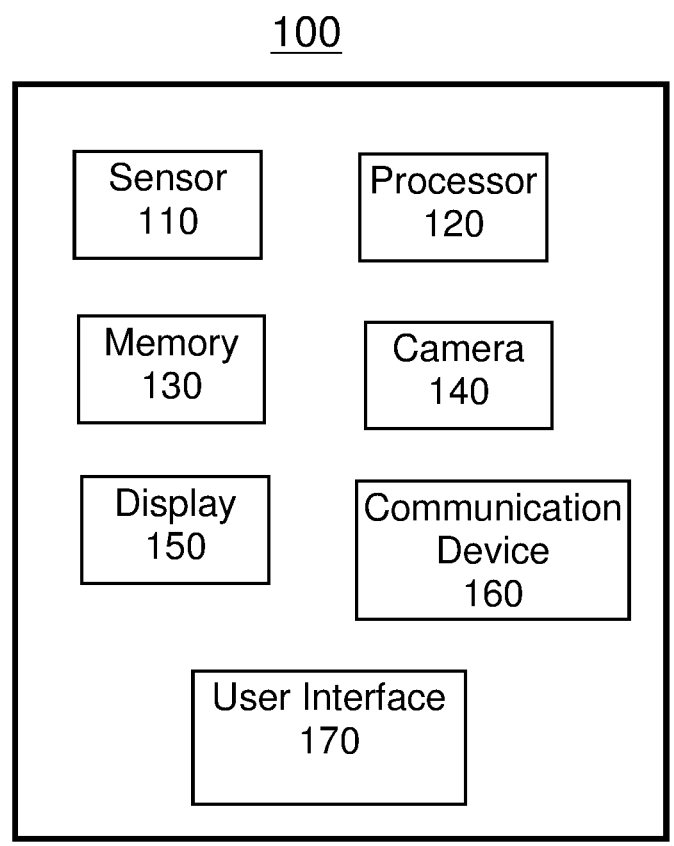
FIG. 1 is a block diagram illustrating an example of an electronic device in accordance with the present disclosure.

A more complete understanding of the components, processes and apparatuses disclosed herein can be obtained by reference to the accompanying drawings. These figures are merely schematic representations based on convenience and the ease of demonstrating the present disclosure and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/components/steps and permit the presence of other ingredients/components/steps. However, such description should be construed as also describing compositions, articles, or processes as "consisting of" and "consisting essentially of" the enumerated ingredients/components/steps, which allows the presence of only the named ingredients/components/steps, along with any impurities that might result therefrom, and excludes other ingredients/components/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

Original aspect ratio (OAR) is the aspect ratio in which visual content is originally produced. Oftentimes a user operating an image capture device, such as a camera, may select the OAR of the visual content to be captured. The user may select a specific aspect ratio based on the desired end use display for the visual content. A display device as described herein, is a device having a function of controlling visual content displayed on an associated display, such as a display panel. The desired end use may be a wide format television, cinema screen, personal computer display, tablet, smartphone display, smartwatch, etc. When the OAR of the visual content matches the aspect ratio of the display, the visual content fills the entire field of view of the display.

When the OAR of the visual content does not match an aspect ratio of a display device the OAR may be modified. For example, viewing a cinema format (a substantially rectangular visual content format) on a standard television (a substantially square display) may require the OAR be converted to a modified aspect ratio (MAR) by enlarging the original image to fill the display area, while cutting off the excess area. In other modifications, the visual content is stretched to fill in the area according to the new ratio. Modified aspect ratio (MAR) is the aspect ratio assigned in order to fit a type of screen, and different from the dimensions of the device in which the visual content is captured.

Sometimes it is desirable to maintain the OAR when viewing the visual content on a display device. In some modifications wherein the OAR is maintained, the visual content is letterboxed. In other modifications, the visual content is pillarboxed. In yet other modifications, the visual content is both letterboxed and pillarboxed. Letterboxing is a modification to the presentation of visual content captured in a widescreen format and transferred to a display device having a display of smaller width that preserves the visual content's OAR. In letterboxing, the display device presents the visual content with bars, e.g., black bars positioned above and below the content. Pillarboxing is a modification of the presentation of visual content wherein the OAR width is smaller than the width of the display of the display device.

In pillarboxing, black bars are placed on one or more sides of the visual content in order to preserve the OAR of the visual content.

Maintaining the aspect ratio becomes more difficult when the display device viewing the visual content is capable of having multiple display orientations. For example, a display device may be a smart device, such as a smartphone or tablet, and can view visual content in a portrait mode and a landscape mode. That is, display devices are typically equipped with a sensor that detects the orientation of the display device and switches a display mode (portrait and landscape) based on the detected orientation of the display device. A portrait mode is perhaps best described as a thin, tall, rectangular-like shape. In other words, the height of the display is greater than the width, yielding a vertical aspect ratio, for example and without limitation 9:16 and 4:5 aspect ratios. A landscape mode is perhaps best described as a wide fat rectangular shape. In other words, the width of the display is greater than the height creating a horizontal aspect ratio, for example and without limitation 1.91:1. When horizontal visual content, having a horizontal aspect ratio and intended for horizontal displays, is viewed in a landscape mode, the visual content is capable of filling the majority of the display. The viewer, rotating the viewership device to initiate a portrait mode, views the horizontal visual content with modifications, often including margin effect combined with a zoom effect that makes the image appear smaller or further away.

The portrait and landscape modes for capturing and viewing visual content are discrete. That is, the display presents the visual content in either a portrait mode or landscape mode and abruptly switches between the two modes, usually upon reaching a threshold rotation of the viewership device. In this manner, the visual content is viewed as "jumping" from one mode to another without intermediate states as the device rotates. This jumping effect is further emphasized to a user when the visual content is modified such that different margin effects are present in one or both orientations.

In accordance with the present disclosure, an electronic device 100 is configured to generate and modify visual content such that the aspect ratio is preserved across display devices having different aspect ratios. With reference to FIG. 1, a block diagram illustrates an example of an electronic device 100. The electronic device 100 includes at least one motion sensor 110 configured to detect an orientation of the electronic device 100, a processor 120, and a storage medium/memory 130. These components are configured together in a manner well known in the art.

In some embodiments, the electronic device 100 includes an image sensor 140, such as a camera, configured to capture visual content. In some embodiments, the electronic device 100 also includes a display 150, configured to display visual content to a viewer.

In some embodiments, the electronic device 100 is equipped with a communication device 160 configured to send visual content to another device or storage (storage including a hard drive, memory, cloud storage, media platforms). The communication device 160 may include wired communication components, wireless communication components, cellular communication components, near field communication (NFC) components, Bluetooth® components, Wi-Fi® components, and other communication components to provide communication via other modalities. This list of exemplary communications devices is intended to be exemplary and not preclude the use of one or more of these components alternately or in combination or preclude the use of still other communication components that perform substantially the same function in substantially the same way.

The electronic device 100 may also include a user interface 170 configured to receive commands from a user of the device 100. The user interface 170 may include without limitation, a touchscreen device, a keyboard, a mouse, motion sensors, buttons, knobs, voice actuation, and the like.

The motion sensor 110 may be a gravity sensor, an accelerometer, a gyroscope, and/or any sensor(s) configured to detect one or more motions and/or an orientation associated with the electronic device 100. A motion capable of detection by the motion sensor 110 may be a tilt, wherein the device is moved to a sloping position, i.e., at an angle with respect to a horizontal plane. Another motion capable of detection by the motion sensor 110 may be a rotation, wherein a rotation is moving the electronic device 100 within a single plane, e.g. orientating the electronic device 100 from a portrait orientation to a landscape orientation, vice versa, or to intermediate orientations between a portrait and landscape orientation. A motion may also include an acceleration, wherein the motion sensor 110 may detect a change in velocity of the electronic device 100 in any direction. A motion may also be a combination of any or all movements of the electronic device 100. It is to be appreciated that the electronic device 100 may include multiple motion sensors, for example and without limitation, the electronic device 100 may include a gravity sensor, an accelerometer, and a gyroscope. While the motion sensors 110 may be located anywhere on the electronic device 100, typically the motion sensors 110 are internal components of the electronic device 100 and in electronic communication with the processor 120.

A gravity sensor is a motion sensor 110 that is configured to measure an orientation with respect to the direction of gravity. The gravity sensor enables the electronic device 100 (via the processor 120) to recognize the direction of gravity relative to the device based, for example, on calculated three-dimensional vectors. The gravity sensor may indicate an orientation, such as a degree of rotation with respect to the direction of gravity, of the electronic device 100. The detected orientation may be combined with the acquisition of visual content by the electronic device 100. That is, the visual content may be tied to the direction of gravity such that the visual content is weighted. Here, "weighted" visual content is visual content that is aligned with the direction of gravity. For example, when capturing visual content via an electronic device 100, (e.g., a tablet or a smartphone) orientated in a landscape mode, wherein the long axis of the electronic device is perpendicular to the direction of gravity, the visual content is assigned a gravity vector that is perpendicular to the long axis of the electronic device 100. If the electronic device 100 is rotated at an angle, for example 30 degrees with respect to gravity (detected by the motion sensor 110), the visual content will be tagged with a gravity vector that is also offset by 30 degrees. When the visual content is displayed on a viewership device, the tagged gravity vector will be aligned with a detected direction of gravity of a viewership device (described in greater detail below). The gravity sensor may also be used to determine a tilting direction of the electronic device 100.

An accelerometer is a motion sensor 110 configured to detect a change in velocity during a time period and senses an acceleration. A three-axis accelerometer may include multiple motion sensors positioned in the x, y, and z-axis directions. The processor 120 of the electronic device 100 receives from the accelerometer values measured in the multi-axis directions as vector values. The processor 120 may then determine a direction in which the electronic device 100 is rotated or tilted based on values obtained with respect to the three axes.

A gyroscope is a motion sensor 110 configured to calculate an angle to which the device 100 rotates with respect to an axis. This may be represented as a numerical value. A three-axis gyroscope calculates the degree to which the device 100 rotates with respect to three axes.

In some embodiments, a motion sensor 110 may be an external sensor in communication with the electronic device 100. That is, the motion sensor 110 may be a plug-and-play device configured to connect with an input/output (I/O) interface of an electronic device 100 and communicate with the processor 120.

The processor 120 is configured to control the operations of the electronic device 100 and may execute applications, apps, and instructions stored in the device memory 130 and/or accessible via the communication device 160. Generally, the processor 120 determines whether to rotate visual content displayed on the display 150 based on data obtained from at least one motion sensor 110.

In some embodiments, the electronic device 100 is equipped with an image sensor 140, embodied as a camera or similar sensor for acquiring visual content. A user of the electronic device 100 may take photographs or record video by manipulating a user interface 170 to employ the image sensor 140. When the image sensor 140 of the electronic device 100 captures the visual content (photograph, image, video, etc.), a motion sensor 110 may apply a "weight" to the visual content. When visual content is shared or accessed, a viewership device displaying the visual content will orient the visual content such that the assigned weight or a preferred direction is in line with the true direction of gravity. More about the visual content and its association with a weight and/or a preferred direction is discussed in greater detail below.

The electronic device 100 may store the visual content into the memory 130. In some embodiments, the electronic device 100 may upload the visual content to an external storage device, such as an external hard drive, cloud, internet storage, etc. via the communication device 160. The communication device 160 may support two-way communication with other devices, cloud storage, networks, and external storage devices by using a variety of technologies. The communication device 160 may include a network interface component or other suitable device to interface with a network. In other examples, the communication device 160 may include wired communication components, wireless communication components, cellular communication components, near field communication (NEC) components, Bluetooth® components, Wi-Fi® components, and other communication components to provide communication via other modalities. This list of communication devices is intended to be exemplary and not preclude the use of one or more of these components alternately or in combination or preclude the use of still other communication components.

The communication via the communication device 160 may be for the purposes of storing visual content, obtaining visual content, and sharing visual content with other devices including viewership devices. In some embodiments, the communication device 160 is configured to connect to a social media network wherein the visual content may be uploaded, stored, or otherwise accessible by one or more users of the social media network.

Figure 2:
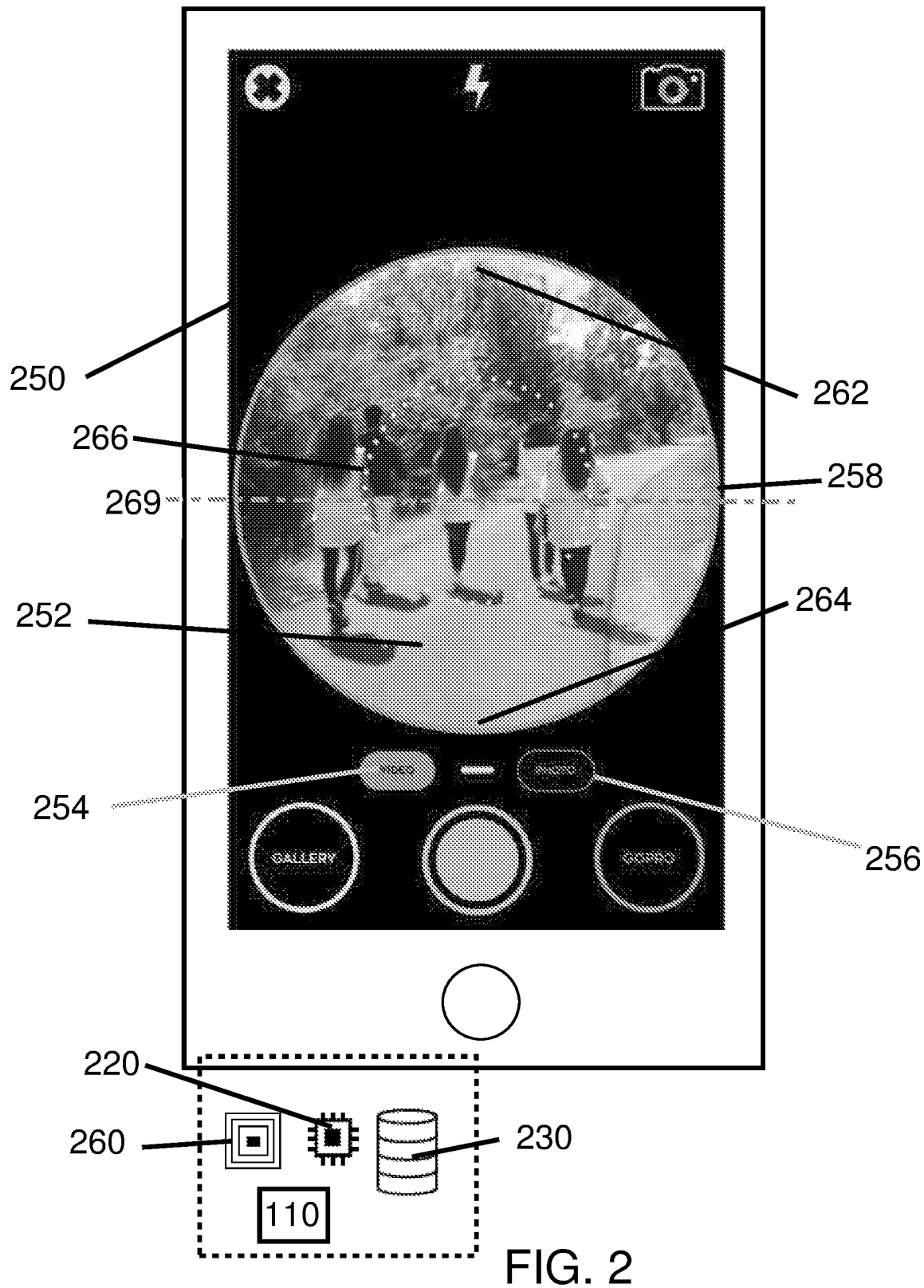
FIG. 2 is an example of a user interface of an electronic device in accordance with the present disclosure.

FIG. 2 is an exemplary embodiment of a software application run on an electronic device 200 controlled by device processor 220 configured to capture visual content in accordance with the present disclosure. The electronic device 200 includes a touch screen display 250 which simultaneously displays visual content 252 and provides a user interface for user operation of the electronic device 200 and various features presented by the software program. The electronic device 200 may be operable in a video mode 254 or a photograph mode 256 by selecting the desired mode via the user interface. A video mode is an operational mode of an onboard image sensor configured to capture a series of images over time (frames). A photograph mode is an operational mode of an onboard image sensor configured to acquire at least one or several images over a short period of time. An image sensor 240 in electronic communication with the processor 220, is configured to capture visual content 252 which is displayed on the display 250. That is, the electronic device 200 may be a visual content capture and formatting device as well as a visual content viewership device.

Generally, when an electronic device 200, for example and without limitation, a smartphone or tablet, is used to capture visual content, an image representing all the visual information captured by the image sensor of the camera is presented on the display 250. Thus, generally and in some embodiments disclosed herein, visual content would fill both the circle portion 258 and blacked out portion (outside the perimeter of image 258) shown on display 250 to a user while being captured. Here, FIG. 2 shows the result of cropping all visual information captured by the image sensor 240.

In some embodiments, the software of the electronic device 200 projects a sweet spot target 266 (indicated by the dotted circle) on the visual information as it is captured. As will be discussed in more detail below, the sweet spot target 266 contains the visual content that will always be displayed on a viewership device regardless of orientation and aspect ratio for reasons which will become more apparent below. In some embodiments, the sweet spot target 266 is generally the geometric centered portion of the visual information displayed. This may be the default position of the sweet spot target 266. In other embodiments, a user may select the geometric position of the sweet spot target 266 within the bounds of the visual information.

The processor 220 executes instructions stored in either the memory 230 or instructions accessible via communication device 260 to perform a cropping method on visual information that is captured by the image sensor 240. The method includes (i) cropping the visual information captured by the image sensor 240 to a circle format 258 visual content and (ii) coding/syncing the cropped circular visual content. Preferably, the circle format 258 does not exceed the narrower dimension of the visual information displayed on the electronic device in either portrait or landscape, or at an angle therebetween.

Currently the majority of visual content is captured rectangular in form, either formatted to a portrait orientation or more commonly, a landscape orientation. The rectangular visual content may be the visual information acquired from the image sensor 240 of the electronic device 200, or the rectangular visual content may be visual content captured by another imaging device (such a digital point and shoot camera or wide format cinema camera) and imported to the electronic device 200 for formatting purposes. The first part of the cropping method removes portions of the visual content such that the remaining visual content is circular in format. For example and with reference to FIG. 2, the visual information may fill the entire display 250, including the parts that are represented as blacked out. Cropping the visual information removes portions of the visual information leaving the circular visual content 258. When parts of the visual content are removed, the resolution of the visual content (the detail held by the visual content) stays the same. However, it is to be appreciated that the storage size of the visual content file itself may be reduced, providing in some embodiments, a memory saving function.

The processor 220 is also configured to sync the cropped visual content to the motion sensors 110 of the electronic device 200 that captures the visual content. In some embodiments, and as illustrated in FIG. 2, the circle format 258 of the visual content is coded to the motion sensors 110 in order to link the visual content to a stable reference or "horizon line" 269. The stable horizon line is a reference line that is configured to be perpendicular to the direction of gravity. In some embodiments, the visual content is synced with a gyroscope sensor of the electronic device 200. While this may be the most efficient way to do this, it is contemplated that the software of the electronic device 200 may obtain an image and determine a most likely preferred orientation of the visual content and assign or link the visual content to a reference line (e.g., horizon, gravity).

Figure 3:
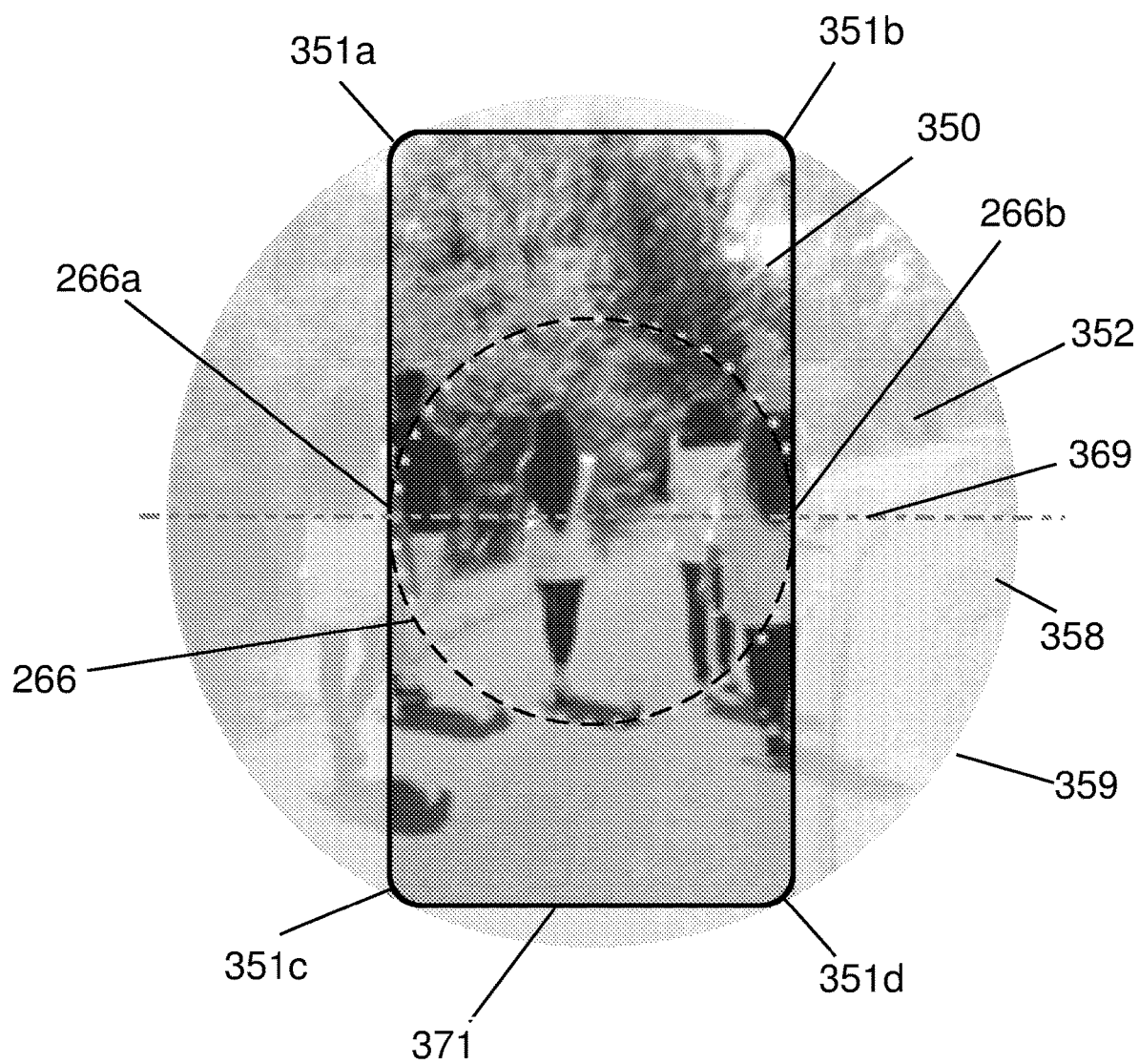
FIG. 3 is a graphical representation of a viewer device presenting visual content in accordance with the present disclosure.
Figure 4:
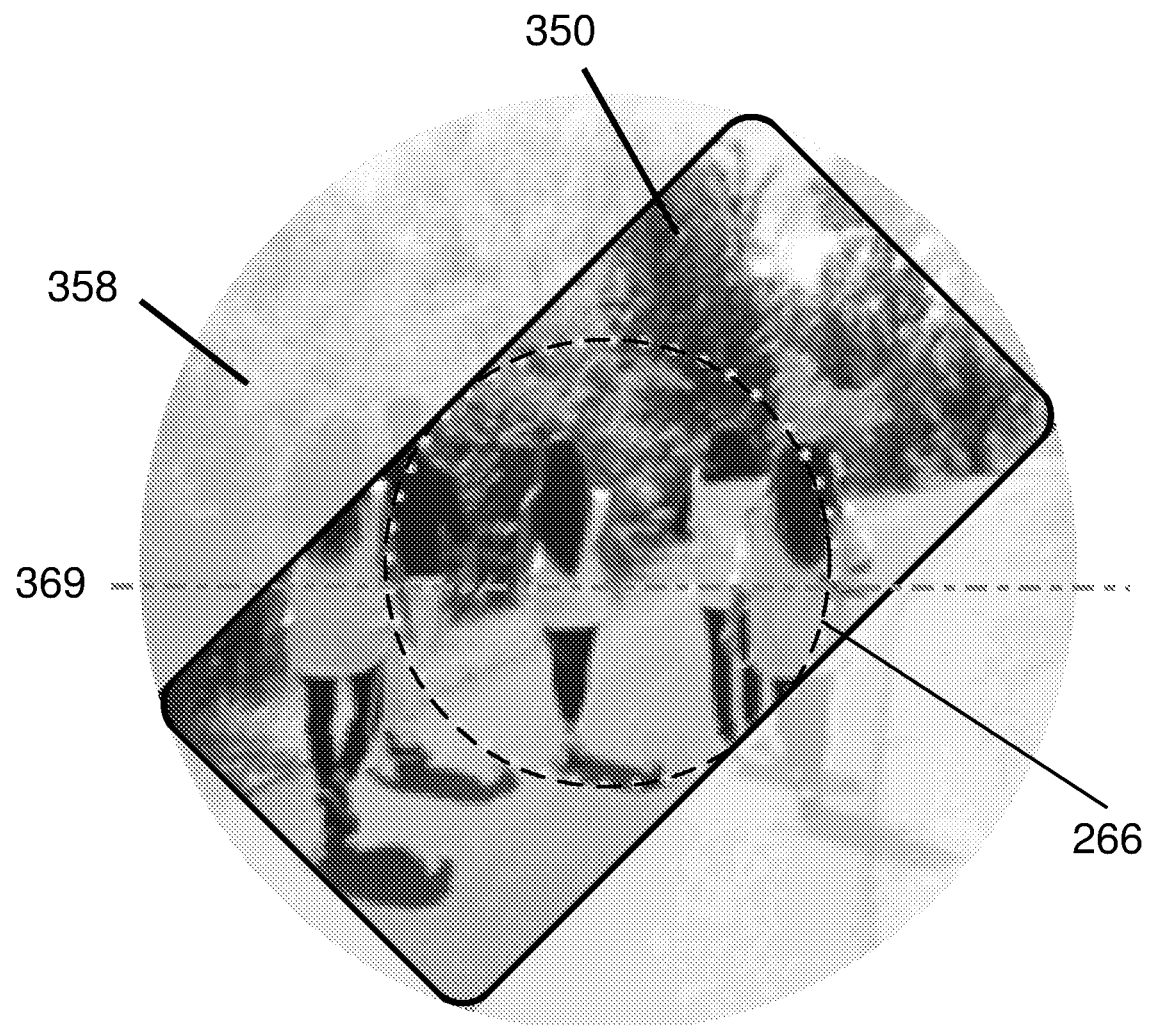
FIG. 4 is a graphical representation of a viewer device presenting visual content in accordance with the present disclosure.
Figure 5:
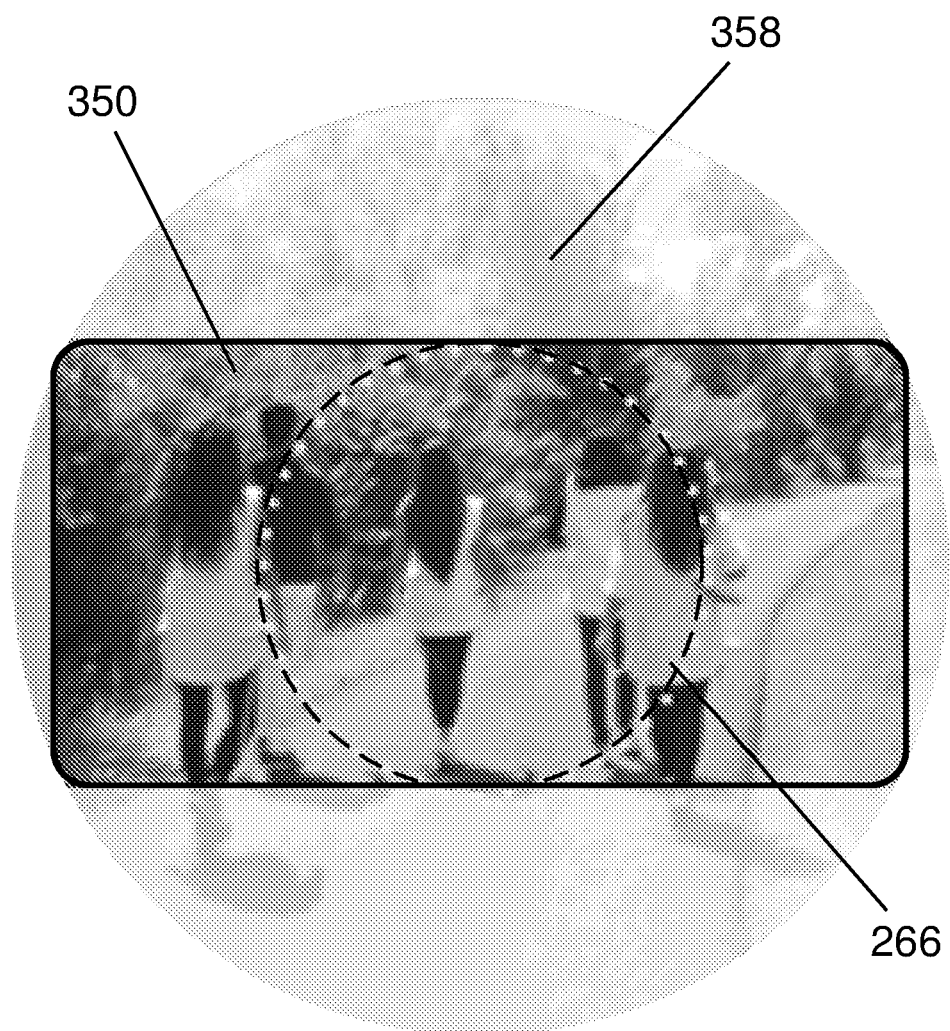
FIG. 5 is a graphical representation of a viewer device presenting visual content in accordance with the present disclosure.

The addition of a reference system to the circular format and/or gyroscope syncing allows for the visual content to have a preferred orientation. In some embodiments, the orientation of the coded visual content is modified with respect to a detected direction of gravity by a motion sensor on a viewership device. This provides a reference point that allows the coded visual content to rotate on the display of a viewership device counter to an opposite rotation of the viewership device such that the visual content appears to the user as being stationary. That is a determined bottom 264 of the visual content is always associated with the direction of gravity. The effect of a stable viewership is best illustrated in FIGS. 3-5 and is described in greater detail below.

In some embodiments, the motion sensors 110 of the electronic device 200 define the orientation of the visual content, such as defining the top 262 and bottom 264 of the visual content 252. In some embodiments, the visual content 252 is weighted such that the bottom 264 of the visual content is the closest to the bottom-most portion of the display 250.

In some embodiments, after the visual content is captured/recorded the visual content may be further edited by a user. Editing includes any enhancements or changes to the visual content appearance, including, but not limited to, changing the sweet spot, resolution, and zoom, as well as changing the saturation, brightness, color, graphics and the like to the visual content. In some embodiments, the visual content is shared to any type of platform, including, but not limited to, social media, such as Facebook®, Twitter®, iMessage®, etc. It is to be appreciated that editing may be performed on the electronic device 200 or may be distributed to another device configured to receive the visual content for editing. In some embodiments, the editing of the visual content is performed in the cloud.

The circular visual content 258 linked to the motion sensors 110 (circular coded visual content) during creation has many advantages. Once the visual content is finalized, meaning all editing done by the program and user are complete, the visual content may be opened by any viewership device with access to the visual content. A viewership device may be variously embodied, for example the image capture device 200 itself may store an access the visual content as a viewership device. The circular coded visual content may be shared to other viewership devices via communication components that distribute the circular visual content 258 to a viewership device and/or networks, direct linking, etc. It is to be appreciated that a viewership device may be an electronic device equipped similar to electronic device 200. A viewership device may also be a television display, computer monitor, cinema screen, and the like.

With reference to FIG. 3, the circular coded visual content 358 is presented on a viewership device having a viewer display 350. In some embodiments, the circular coded visual content 358 is automatically configured to fit the size of the viewer display 350 of the viewership device. This configuration enables the viewer display 350, having four corners 351*a-d* to touch the circle format 358 in four respective places. While a rectangular viewer display 350 is shown, it is contemplated that the viewership display 350 may be embodied as other shapes. That is, a triangular display may have its three corners each touch the edge of the circle format in three respective places. As an additional example, the viewership display may also be circular in shape wherein the circumference of the display touches the circumference of the visual content 358. The horizon line 369 coded to the visual content 358 defines the orientation on which the visual content is presented on the display 350.

For fixed viewership devices, i.e. those not intended to rotate, the horizon line 369 is parallel to a defined bottom edge 371 of a display 350. In the exemplary example of a widescreen/rectangular computer monitor as a viewership device having a viewer display 350, a user may define the bottom edge 371 as either the short edge, similar to the orientation of the display shown in FIG. 3, or the long edge, similar to the orientation of the display in FIG. 5. This is usually done by changing the display settings of the computer and associated monitor. A user may wish to have a monitor oriented in a traditional landscape orientation, or a user may wish to have the monitor oriented in a portrait orientation. With the orientation defined by a user in the display settings, the horizon line may be linked to the visual content accordingly.

In some embodiments, the viewer display 350 is incorporated into a viewership device similar in nature to the electronic device 100 and 200 of FIGS. 1 and 2 respectively. That is, the viewership device includes at least a viewer display 350, a processor, and at least one motion sensor. The viewership device may be a portable device that is able to be manipulated into a plurality of orientations for viewing the visual content. In these embodiments and as represented in FIG. 3, the circular coded visual content 358 has a first captured image diameter 359. The circular coded visual content 358 is synced to a motion sensor, analogous to motion sensor 110, in communication with a processor, analogous to processor 120 of the viewership device. In some embodiments, the motion sensor is a gyroscope. After the circular coded visual content 358 is synced with the viewership device, a portion of the circular coded visual content 358 is mapped to fit the viewer display 350 of the viewership device. That is, a circumference 359 is correlated with the four corners 351*a-d* of the viewer display 350 so that each corner abuts the circumference 359. Sweet spot target 266 is a smaller diameter portion of the circular coded visual content 358 and specifically is dimensioned so that a diameter of the sweet spot 266 preferably creates a tangent at two locations 266*a*, 266*b* that are diametrically opposite and in tangent contact with the narrow sides of the rectangular viewer display 350. The mapping enables the viewer display 350 having four corners 351a-d to preferably touch the circle format 358 along the circumference 359 in four respective places.

When the viewership device is equipped with a motion sensor, such as motion sensor 110, the circular visual content 358 is rotated in a direction counter of the rotation of the viewer display 350 with respect to the stable horizon line 369. That is, the motion sensor of the viewership device links or syncs to the circular coded visual content 358 and calculates an angle, tilt, and/or rotation of the display 350 with respect to the horizon line 369.

The viewership device, and along with it, the viewer display 350, may be rotated about a plane defined by the circle format 358. In this way, a non-circular display, such as the rectangular display 350 is a viewfinder of the entire visual circular visual content 358. The viewer display 350, may only "view" rectangular portion of the circular coded visual content 358 at a time. The viewed area is represented by the darker image confined within the viewer display 350. It is noted and illustrated in FIGS. 3-5 that the selected rectangular portion viewed on the rectangular display 350 includes the entire sweet spot target 266 no matter what the orientation of the viewer display 350. Select annular portions (i.e. between the sweet sport 266 and circumference diameter 359 will be shown on the rectangular display 350. As will be appreciated, the angular segment of the annular portion that is seen on the rectangular display 350 will vary depending on the physical orientation of the viewer device but in each instance the sweet spot 266 is displayed. Stated another way, the remaining portions of the circular coded visual content, illustrated as the lighter regions of the visual content 352 outside the confines of the display 350, may be viewed and explored on the viewer display 350 by rotating the viewer display to a desired orientation.

It is noted that the visual content captured in sweet spot target 266 (or a portion thereof) is preferably always present no matter the orientation of the viewer display 350. The user of the viewership device is provided with a unique choice in selecting the viewership of the visual content 358 allowing the viewer to play an active role in viewing visual content 358.

The circular coded visual content 358 is continuously rotated as the viewer display 350 is rotated. In this way, there is no abrupt jump in the orientation of the visual content while transitioning the viewer display 350 from a portrait orientation (shown in FIG. 3) to a landscape orientation (shown in FIG. 5). That is, the viewer display 350 presents full screen intermediate orientations during rotation of the viewer display 350 which appear as a seamless continuous transition (i.e. without jumping) at a constant image resolution.

Figure 6:
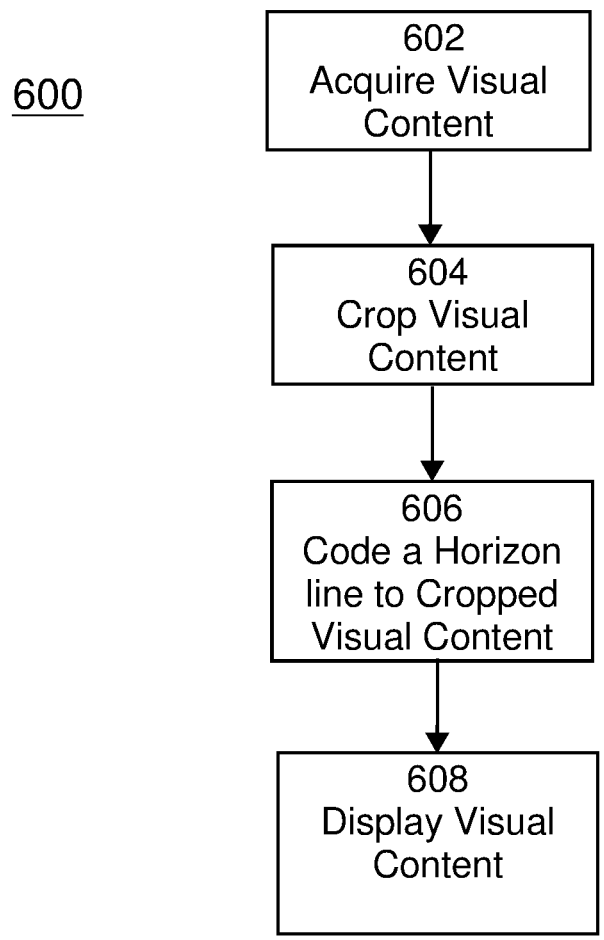
FIG. 6 is a diagram of a method for formatting visual content in accordance with the present disclosure.

In accordance with another aspect of the present disclosure, a preferred method 600 of circularizing and coding visual content is provided. The method 600 is illustrated in FIG. 6 and performed by a device (capturing device, intermediate device/cloud, and/or viewership device) including an electronic processor configured to execute instructions provided on a non-transitory storage medium. For example, the electronic device 100 of FIG. 1 may be employed to perform the method 600. Briefly, the method 600 includes a first step 602 of acquiring visual content. After acquiring the visual content, the method provides cropping the visual content to a circle format, illustrated at block 604. After the visual content is cropped, a horizon line 369 is coded, at block 606, to the cropped visual content creating circular coded visual content. The circular coded visual content may then be displayed, at block 608, on a display device 350 (which could be the image capturing device or another display device) such that the circular coded visual content is mapped to a desired portion of the display.

Visual content may be acquired, at block 602, in several ways. In some embodiments, visual content is created by an imaging sensor, e.g., imaging sensor 140, in electronic communication with the processor 120 of the device 100. In other embodiments, visual content is acquired by importing/downloading visual content via a communication device 160 in electronic communication with the processor 120 of the device 100. The communication device 160 may connect to an internet network, a cellular network, or the like. The communication device 160 may also acquire visual content via wired connections and/or wireless connections.

Once the visual content is acquired it may be stored on a storage medium 150 of the device for further processing. The visual content is then cropped to a circular format as illustrated and described with respect to FIG. 3. Typically, visual content is initially generated in a rectangular form factor by an image sensor that is also rectangular in shape. The processor 120 then crops the rectangular visual content to create a circular format. In this way, existing imaging hardware (i.e., non-circular image sensors) may be employed to create universal visual content.

However, it is to be appreciated that visual content may be created/generated from cameras other than those in direct electronic communication with the processor. As a non-limiting illustrative example, a second device may capture visual content in rectangular form and upload the visual content to a storage device/network. The device processor equipped with the software described herein to perform the method 600 may access the uploaded visual content and, in some cases, download the visual content to a storage medium 150 in electronic communication with the processor 120. The processor 120 may then crop the visual content acquired from the external source.

After the visual content is cropped a horizon line is coded, at block 606, to the circular visual content 358. In some embodiments, a motion sensor in electronic communication with the processor of the device is used to define and code a horizon line to the circular visual content. The motion sensor may be any sensor known to detect an orientation of visual content or the device including a display configured to present visual content. In some embodiments, the motion sensor is a gyroscope. In other embodiments, the motion sensor is an accelerometer. In yet other embodiments, the motion sensor is a gravity sensor. In still yet other embodiments, the motion sensor is a plurality of sensors including any combination of two or more sensors described herein.

In some embodiments, a horizon line is a user-defined line coded to the cropped visual content. In this way, a user controlling the processor via a user interface may manually select a horizon line for the visual content. In some embodiments, this selection may override a horizon line potentially coded to the cropped visual content as determined by at least one motion sensor in electronic communication with the processor.

The circular coded visual content may then be presented on a viewer display 350. In some embodiments the viewer display is in electronic communication with a processor of a viewership device. In other embodiments, the display is incorporated into a viewership device separate from the device performing the formatting method 600.

The horizon line coded to the circular coded visual content indicates to the viewership device at least the orientation the visual content is to be displayed. Generally, and perhaps preferably, the horizon line is to be parallel with a bottom edge of the display although other orientations are not precluded.

When the viewership device is equipped with a motion sensor, such as a gyroscope, the circular coded visual content is synced to the gyroscope of the viewership device. A rectangular portion of the circular visual content is selected to fit the size of the viewer display based on a corresponding detected orientation of the viewership device. As a motion sensor, such as a gyroscope, senses rotations of the viewership device, the selected rectangular portion of the circular content changes based upon the detected rotation. For example, in the reference frame of the visual content, when the motion sensor of the viewership device detects a viewership device portrait orientation as illustrated in FIG. 3, a matching portrait selection of the circular visual content 358 is displayed. When the motion sensor of the viewership device detects a rotated orientation, as illustrated in FIG. 4, a corresponding angled rectangular selection of the circular visual content 358 is displayed on the viewer display. When the motion sensor of the viewership device detects a viewership device landscape orientation as illustrated in FIG. 5, a matching landscape selection of the circular visual content 358 is displayed. Explained in the reference frame of a user of the viewership device, when the viewership device is rotated about an angle with respect to either the horizon line 369 or direction of gravity, the circular visual content is rotated at the same angle in the opposite direction, such that a different rectangular portion of the circular visual content is presented on the viewer display. This allows for all visual content to be viewed on any display without the need to pillarbox, letterbox, or otherwise modify the visual content. It also provides for the seamless, continuous transition of the image/visual content as the viewing device is moved from a first orientation to a different, second orientation.

It is to be appreciated that the current devices and methods may utilize pre-existing common hardware such as cameras integrated into smart devices and the like. Thus, the devices and methods operate without specialized equipment. It is contemplated in this disclosure that video content may be captured and acquired, that is, already in a circular format. In these cases, the device(s) and methods may either (i) further crop the circular format and code the visual content accordingly or (ii) code the captured circular visual content without first cropping the visual content.

In accordance with another aspect of the present disclosure, an imaging device includes an electronic processor and at least one image sensor and at least one motion sensor. In some embodiments, the at least one image sensor is a camera. In some embodiments, the at least one motion sensor is a gyroscope. Here, the image sensor and gyroscope are linked such that when capturing visual content, the image is stabilized. For example, an imaging device may capture visual content such as an image of a person standing. Generally, when capturing visual content of a person in a portrait orientation, wherein the height of the visual content is greater than the width, a person may appear as being parallel to the long axis (height) and perpendicular to a short axis (width). When the imaging device is rotated during capture, the person is captured at an angle with respect to the axes of the orientation format. When the rotated, captured content is subsequently displayed, the person standing is presented on a viewer display at an angle mirroring the rotation of the imaging device.

When the gyroscope is linked to the imaging sensor, the gyroscope may detect rotations during capture of the visual content. In this way, when the video content is later viewed/ replayed the video content is displayed such that the rotation during capture does not affect the orientation of the content displayed, Said another way and using the example of capturing an image of a person standing, when viewing the visual content of a person standing during rotation, the person standing will appear to be perpendicular to the short axis and parallel to the long axis. Thus, the captured visual content is rotated in response to a rotation of the imaging device.

In some embodiments, the imaging device processor is further configured to capture the visual content as a circle from the shot. In other embodiments, the imaging device processor is further configured to crop the captured visual content into a circle.

In some embodiments, software executed by the imaging device processor creates a non-rectangular visual content and incorporates the captured non-rectangular visual content with a motion sensor, e.g., gyroscope, gravity sensor, accelerometer, etc., associated with the imaging device as well a motion sensor associated with a viewer device. In this manner, the processor configures the visual content viewed on the viewer device to fill the entire display of the device. That is, there are no visible margins (pillarboxing, letterboxing, and the like) and the viewer can view the visual content in any orientation—landscape, portrait, or any degree in between—with the image adjusting in real-time using the gyroscope.

It is recognized that current imaging devices use rectangular solid-state imaging sensors mounted behind at least one circular lens. There are several issues with the current systems. First, there is a mismatch in area between the lens and the image sensor, which makes selecting the proper lens an important consideration when creating the desired visual content. This is illustrated in FIGS. 7A-7B.

Figure 7A:
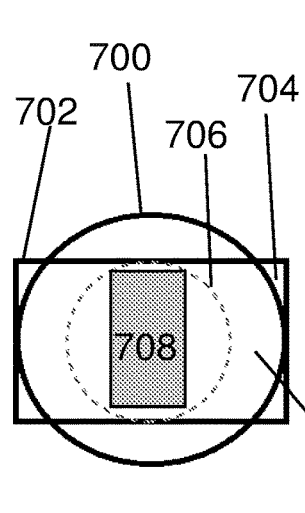
FIG. 7A-C is a diagram of prior art rectangular image sensors compared to circular image sensors in accordance with the present disclosure.
Figure 7B:
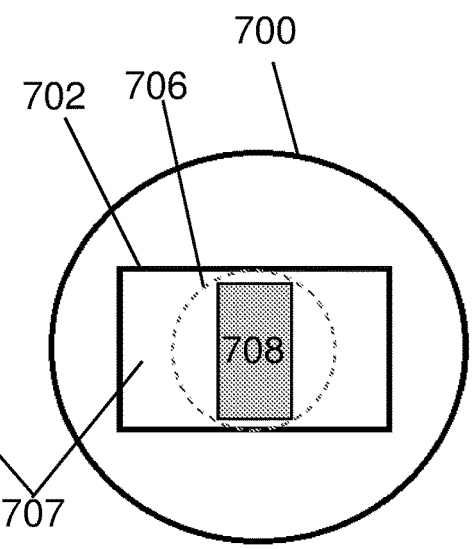

FIGS. 7A-7B illustrate various lens 700 and sensor 702 arrangements. If the circular lens 700 is too small for the corresponding rectangular image sensor 702 as shown in FIG. 7A, then the final image may appear to have dark corners as the corners 704 of the image sensor 702 will have minimal exposure to incoming light. On the other hand, if the circular lens 700 is bigger than the image sensor 702 as shown in FIG. 7B, then the information captured by the lens 700 outside the area of the image sensor 702 never makes it to the image sensor for capturing and is, therefore, lost. Said another way, when the lens format is larger than the image sensor, the field of view is reduced.

Another potential issue is when the software described herein circularizes, via cropping, the captured visual content associated with rectangular imaging sensors. That is, some of the visual information 707 captured by the image sensor 702 is lost. This means that, in some cases, resolution of the final visual content is reduced. In other words, a cropped circle 706 mapped to the rectangular shape loses the visual content information captured by the ends of the imaging sensor 702, for example, 4 k resolution image may be reduced to about 2.5 k resolution (these values are representative only, and should not be deemed to be limiting). Under some rare circumstances the visual content may appear to be pixelated. One advantage to the cropping is that the process provides a data storage savings of up to 50% as the information that is lost during the cropping step or process is not saved with the corresponding visual content file.

Figure 7C:
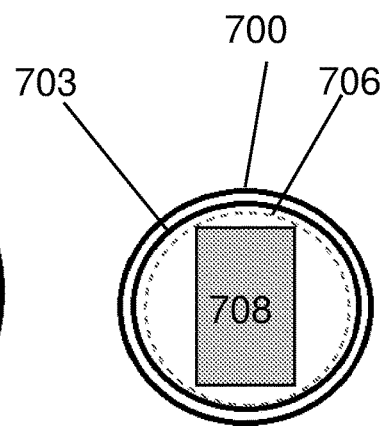

The advantage of using a circular image sensor is apparent in FIG. 7C. While the lens 700, circular image sensor 703, and cropped circle 706 are shown as decreasing in size respectively, it is noted that this reduction is merely for illustrative purposes and that the sizes of each or some of the elements are substantially the same and/or may slightly overlap. The circular lens 700 and circular image sensor 703 are configured such that the most visual information captured by the lens is directed to the circular sensor 703. This effectively minimizes any losses that are present when a circular lens is paired with a rectangular image sensor such as those illustrated in FIG. 7A and FIG. 7B. In other words, the maximum amount of captured information is able to be presented on display 708.

In some embodiments, the circular image sensor 703 generates a circular image without further cropping needed. In other embodiments, a circular image generated from the circular image sensor 703 may be cropped to a circle 706. The further cropping may be advantageous as it may provide data storage savings for the final visual content file.

In some embodiments, an imaging device includes at least one circular lens 700 in optical communication with a circular image sensor 703. A motion sensor, similar to that of sensor 110 illustrated in FIG. 1, is configured to link a horizon, similar to horizon line 369 of FIG. 3, to the visual content.

It is noted that fisheye type lens may produce a circular image. However, fisheye lenses also create a distortion known generally as the fisheye effect which is not always desirable. The fisheye lens is an ultra-wide angle lens that produces strong visual distorting intended to create a hemispherical image. Instead of producing images with straight lines of perspective, a fisheye lens uses a special mapping which gives the characteristic convex non-rectilinear appearance. The circular imaging sensor is able to maximize the visual content captured by the lens with little to no distortion. That is, visual content produced by the circular image sensor has straight lines of perspective. Thus, the visual content and lenses used to create the captured image in accordance with the present invention is advantageously achieved without a fisheye type lens.

Figures 8A, 8B:
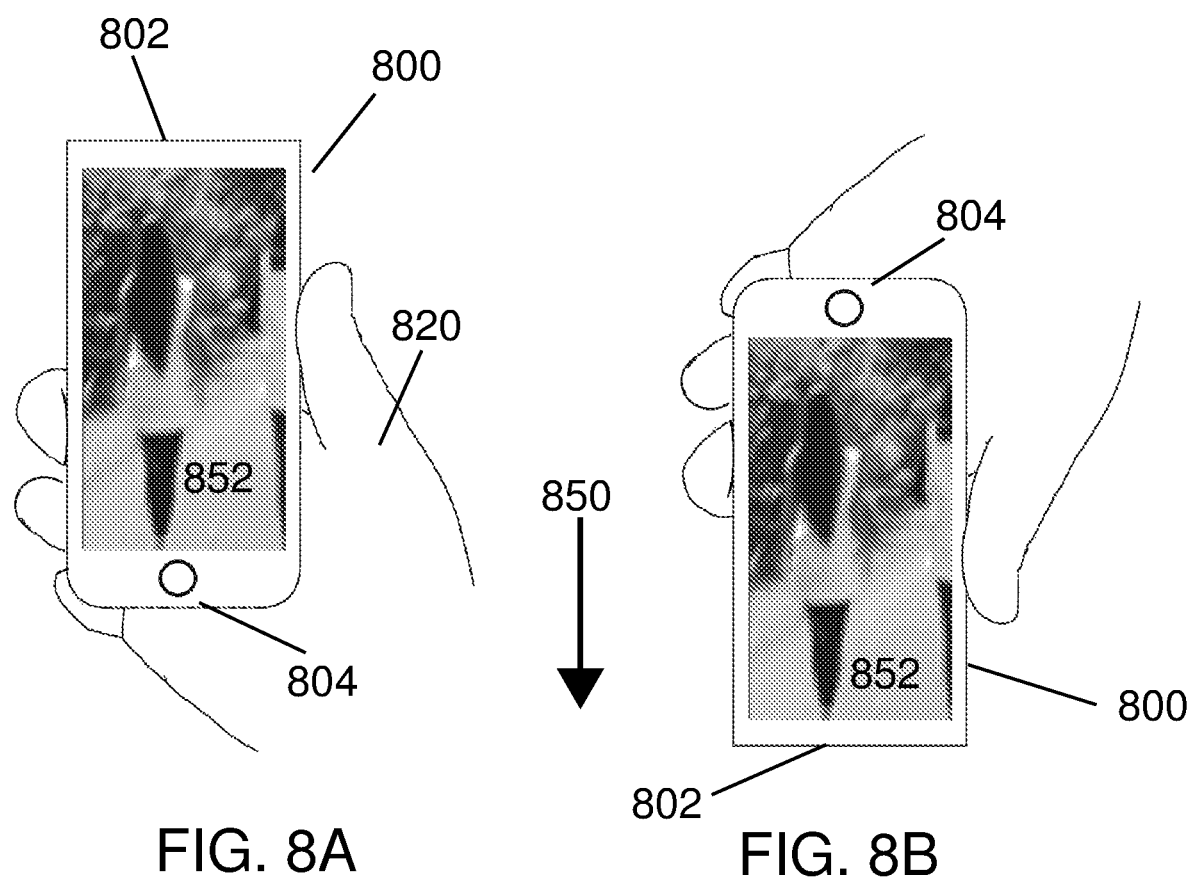
FIGS. 8A and 8B illustrate a device and visual content in accordance with the present disclosure.

FIGS. 8A and 8B illustrate an advantage of associating circular visual content to a motion sensor of a viewership device. In some embodiments, a viewership device 800 has a top 802 and a bottom 804. Generally, a user 820 holds the viewership device 800 in a portrait orientation as illustrated in FIG. 8A. That is, the bottom 804 of the viewership device 800 is seated about the user's palm and the viewership device 800 is held upright. The visual content 852 is accompanied with a preferred orientation with respect to gravity. That is, the visual content 852 may be captured via an image sensor associated with a motion sensor as described above. Alternatively, the visual content may be tagged with a preferred direction via manually selecting a preferred direction of gravity 850 or via coding (either via the capturing device and/or via an intermediate device). The viewership device 800 includes at least one integrated motion sensor, analogous to motion sensor 110, that may detect the viewership device's movements. Preferably, the at least one integrated motion sensor, detect information corresponding to the viewership device's 800 orientation with respect to the direction of gravity 850. In FIG. 8A, the viewership device 800 is held upright with respect to the direction of gravity 850 and in FIG. 8B the viewership device 800 is held upside-down with respect to the direction of gravity 850. However, as illustrated in both FIG. 8A and FIG. 8B the visual content 852 is orientated in the same way with respect to the direction of gravity 850. Thus, there appears to be a "weight" tied to the visual content 852 such that the visual content is always displayed upright with respect to the direction of gravity 850.

Generally, when a user is viewing visual content on a viewership device 800, the viewership device 800 is held upright as in FIG. 8A. Currently, if a user 820 wanted to show the visual content 852 on the display of the viewership device 800 with another person standing across from the user, the user 820 would need to rotate their hand in an azimuth fashion such that the orientation of the viewership device 800 with respect to the direction of gravity 850 is constant throughout the rotation. In other words, the display of the viewership device 800, which was previously facing the user in an upright orientation, is rotated to face another person across from the user also in an upright orientation. Maintaining this hand position while showing the visual content 852 on the viewership display to another is uncomfortable for the user. However, associating the visual content with a motion sensor of the viewership device 800 the user 820 simply flips their wrist such that the viewership device 800 is orientated upside-down with respect to the direction of gravity 850 as illustrated in FIG. 8B. With the visual content unconnected to the motion sensors of the device, this flipping hand motion would result in showing visual content 852 that is also upside down. With the visual content 852 "weighted", the visual content 852 is rotated by the processor of the viewership device 800 such that the preferred direction of the visual content is in alignment with the detected direction of gravity 850 by the integrated motion sensors.

In the cases wherein the visual content 852 is a graphical application or a graphical user interface (GUI) such as an operating system, the user 820 may operate the application or operating system on the viewership device 800 easily in any direction. Generally, the orientation of a GUI operating system, such as ANDROID® or iOS®, is fixed with respect to the top 802 and bottom 804 of a viewership device 800. When a user 820 picks up the device in a random orientation, the user 820 must rotate the viewership device 800 in their hands until the bottom 802 of the device 800 is seated in the user's palm (if operating in a portrait mode). This rotation action takes times, risks potential clumsiness of the user 820 dropping the viewership device 800, and is unnecessary. With the GUI associated with a preferred direction and tied to at least one motion sensor of a viewership device 800, a user 820, may pick up the viewership device 800 from a table the ground, etc. and, no matter the orientation of the device (upright or upside down), the GUI is displayed upright with respect to gravity 850. This allows a user 820 to start experiencing and using the GUI immediately upon picking up the viewership device 800.

It is to be appreciated, that the motion sensors of a content creation, formatting and/or viewership device may be coupled to either circular visual content or rectangular visual content.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

Although specific advantages have been enumerated above, various embodiments may include some, none, or all of the enumerated advantages. Although exemplary embodiments are illustrated in the figures and description herein, the principles of the present disclosure may be implements using any number of techniques, whether currently known or not. Moreover, the operations of the system and apparatus disclosed herein may be performed by more, fewer, or other components and the methods described herein may include more, fewer or other steps. Additionally, steps may be performed in any suitable order.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

It is claimed:

1. A formatting device for visual content comprising:
a motion sensor,
an image sensor, configured to capture visual content data in a format having a wider dimension boundary and a narrower dimension boundary;
a storage medium that at least temporarily stores the captured visual content data therein; and
a processor configured to code the captured visual content data in a circular format wherein the circumference of the captured visual content data forms tangents with but does not exceed the narrower dimension boundary of the captured visual content data; and
the processor links the circular format visual content data to a horizon line defined by the motion sensor
wherein the captured visual content data comprises at least one image.

2. The formatting device according to claim 1, further including an electronic device that includes a communication device to forward the circular coded and linked visual content data from the electronic device.

3. The formatting device according to claim 2, used in combination with a viewer device, wherein the viewer device includes a communication device configured to receive the circular coded and linked visual content from the formatting device, the viewer device configured to define a smaller diameter portion of the circular coded visual content that is dimensioned so that the diameter creates a tangent in contact with narrower sides of the viewer device.

4. The formatting device used in combination with the viewer device according to claim 3, wherein the viewer device includes a display for displaying at least one image based on the circular coded and linked visual content data from the formatting device.

5. The formatting device used in combination with the viewer device according to claim 4, wherein the display of the viewer device is shaped as a polygon having linear sides with a corner defined between adjacent sides.

6. The formatting device according to claim 1, wherein the formatting device includes a communication device for acquiring the previously captured visual content data.

7. A method for creating visual content, the method comprising:
providing an electronic device comprising:
an image sensor configured to acquire image data representing visual content;
at least temporarily storing the captured image data in a storage medium configured to at least temporarily store visual content data captured by the image sensor in a format having a wider dimension boundary and a narrower dimension boundary; and
executing a set of instructions with a processor
wherein the executing step includes coding the captured visual content data in a circular format wherein a circumference of the acquired visual content forms tangents with but does not exceed the narrower dimension boundary of the acquired visual content and generating a circular visual content, and
linking the circular format visual content data to a motion sensor of the device; and
wherein the circular format visual content data is displayed in a manner that fills a viewing device in a continuous transition from portrait to landscape mode.

8. The method of claim 7, further comprising including a gyroscope as at least a part of the motion sensor.

9. The method of claim 7, further comprising displaying the circular visual content on a rectangular display of a viewing device.

10. The method of claim 9, wherein displaying the circular visual content include zooming the circular visual content on a rectangular display of the viewing device, wherein at least one corner of the rectangular display abuts a circle edge of the visual content.

11. The method of claim 9, wherein the displaying step includes rotating the circular visual content on the rectangular display in response to a movement of the viewing device, wherein the viewing device comprises at least one motion sensor for detecting movement of the viewing device.

12. A method for converting visual content from a rectangular display configuration to a universal mode that displays the visual content in at least both portrait and landscape modes without margins comprising:
generating circularly formatted visual content, wherein the circularly formatted visual content is located within the confines of a planar circle having a circle edge;
linking the circularly formatted visual content to a stable horizon line; and
zooming the circularly formatted visual content on a rectangular display of a display device having a wider side and a narrower side, wherein at least one corner of the rectangular display abuts the circle edge of the circularly formatted visual content; and
wherein a smaller diameter portion of the circularly formatted visual content is defined and dimensioned so that the diameter creates a tangent in contact with the narrower side of the display device.

13. The method of claim 12, wherein generating circularly formatted visual content comprises, cropping rectangular formatted visual content to a circular format.

14. The method of claim 13, wherein generating circularly formatted visual content comprises first capturing rectangular formatted visual content with an image sensor.

15. The method of claim 13, wherein generating circularly formatted visual content comprises first importing rectangular formatted visual content via a communication device.

16. The method of claim 12 further comprising rotating the visual content in response to a motion of the display device, wherein the viewer device comprises a motion sensor for detecting the motion of the viewer device.

17. The method of claim 12 wherein rotating the visual content is such that the stable horizon line linked to the visual content is generally perpendicular to the direction of gravity.

18. The method of claim 12, wherein the linking the circularly formatted visual content to the stable horizon line comprises associating the circularly formatted visual content to a motion sensor of a formatting device.

19. An imaging device comprising:
a motion sensor;
an imaging sensor configured to capture visual content in a format having a wider dimension boundary and a narrower dimension boundary, wherein the imaging sensor and the motion sensor are linked during a capture of the visual content, and an electric processor, wherein the processor is configured to code the captured visual content in a circular format, wherein at least one of (i) the circular format of the captured visual content is linked to the motion sensor of the device or (ii) the circular format of the captured visual content is linked to a horizon line defined by the motion sensor, wherein a circumference of the captured visual content forms tangents with but does not exceed the narrower dimension boundary of the captured visual content.

* * * * *